A. P. McARTHUR & E. FLETCHER.
HORN FOR PHONOGRAPHS.
APPLICATION FILED NOV. 1, 1911.
1,150,215.
Patented Aug. 17, 1915.
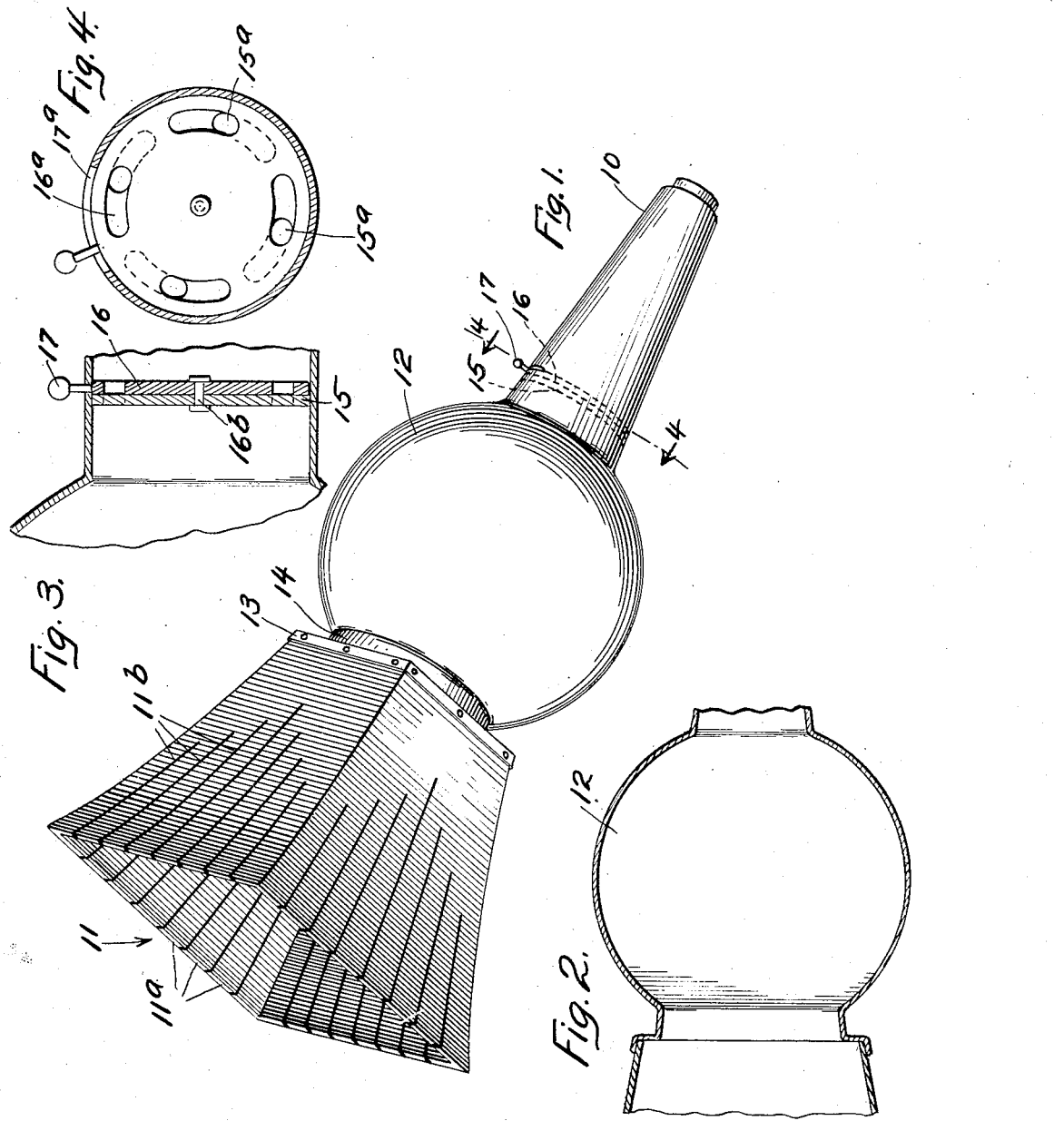
Witnesses:
Inventors:
Alexander P. McArthur
Elmer Fletcher
By Sheridan, Wilkinson, Scott & Richmond Att'ys

UNITED STATES PATENT OFFICE.

ALEXANDER P. McARTHUR AND ELMER FLETCHER, OF CHICAGO, ILLINOIS, ASSIGNORS TO ORATOR MANUFACTURING COMPANY, A CORPORATION OF ILLINOIS.

HORN FOR PHONOGRAPHS.

1,150,215.  Specification of Letters Patent.  Patented Aug. 17, 1915.

Application filed November 1, 1911. Serial No. 658,064.

*To all whom it may concern:*

Be it known that we, ALEXANDER P. MCARTHUR and ELMER FLETCHER, citizens of the United States, residing at 431 South Dearborn street, Chicago, Illinois, have invented certain new and useful Improvements in Horns for Phonographs, of which the following is a specification.

The object of our invention is to provide a horn for phonographs which will control the sound waves in such a manner as to prevent what may be termed "blasting" of said sound waves. In this way we produce a sound having a pure tone in which the harsh and unpleasant features are largely, if not wholly, eliminated.

The objects of our invention will be made more fully apparent in the following specification taken in connection with the accompanying drawings, in which—

Figure 1 is a perspective view of a horn comprising our improvements; Fig. 2 is a longitudinal section of the central portion thereof; Fig. 3 is a sectional view of the damper or modulator, taken along the axis thereof; and Fig. 4 is a cross section, taken along the line 4—4 of Fig. 1, showing details of said damper.

In the drawings the device will be seen to consist of a conduit for sound waves having a tapered form, the smaller end of which is round and conical, as shown at 10. The larger end is square or rectangular, as shown at 11. The intermediate portion 12 is considerably enlarged, and is preferably given a spherical form. The smaller conical portion 10 opens into the enlarged portion 12 at one side, and the rectangular portion is joined to said enlarged portion at the other side, preferably through an intermediate round or conical portion 14.

The angular or square portion 11 is made preferably of wood, and is joined to the intermediate portion at 13 by means of suitable flanges and fastening devices on said intermediate portion. The intermediate and conical portions extending from the flanges 13 to the smaller end 10 are preferably made of one piece of metal.

The smaller conical portion is provided with a cross wall 15, in which apertures $15^a$ are located for the passage of the sound waves. These apertures may be reduced in their extent by the damper 16, which is provided with similar apertures $16^a$. The damper 16 is pivoted centrally at $16^b$ to the cross wall 15. A handle 17, extending through a slot $17^a$ in the wall of the device, permits adjustment of the damper with relation to the apertures in the wall. By this means said apertures may be opened to the extent desired. The said damper is preferably located quite close to the enlarged portion 12, in order that the divided sound waves passing through it may be re-united and expand in said chamber. The portion of the conduit 14 permits the sound waves to flow uninterruptedly between the chamber 12 and the angular portion 11.

The walls of the large end 11 of the horn are divided into longitudinal tongues $11^a$ of various lengths. These tongues may be made by cutting slits $11^b$ in the walls thereof. They may also be made by attaching strips side by side to the body of the horn. These slits break up the continuity of the walls of said outer end and prevent the amplification of the harsh and undesirable portions of the sound. The various lengths of tongues prevent them getting in tune with each other and amplifying said harsh portions of the sound.

The damper directs, modifies and controls the sound waves in such a way as to prevent the blasting of the sound. Its harsh or undesirable features are thereby checked, and the expansion of the waves in the chamber 12 causes a further softening and purifying of the tone.

The horn is constructed of the separate pieces in such a manner as to permit giving it the desired shape required in soundingboard vibrators.

While we have described our invention more or less precisely as regards the details of construction, we do not wish to be limited thereto unduly.

We contemplate changes in the form and proportion of the parts and the substitution of equivalents as circumstances suggest or render expedient without departing from the spirit of our invention.

We claim:—

1. In a conduit for sound waves, a wall across said conduit having apertures, means for regulating the extent of opening of said apertures, and a sound chamber in said conduit having larger dimensions than the adjacent portions of said conduit, a portion of the walls of said conduit being formed into tongues.

2. A conduit for sound waves, a portion of said conduit having a conical form and another portion having a pyramidal form, said conical portion having an enlarged portion adjacent its union with said pyramidal portion.

3. A conduit for sound waves having a metallic portion of circular cross-section, and a non-metallic portion joined thereto, said metallic portion having an enlarged portion forming a chamber.

4. A conduit for sound waves having a metallic portion and a non-metallic portion joined thereto, said metallic portion having an enlarged portion forming a chamber, the walls of said non-metallic portion being formed into tongues.

5. A conduit for sound waves having walls composed of tongues or bars independent of each other in substantially parallel relation.

6. A conduit for sound waves having walls composed of tongues or bars independent of each other in substantially parallel relation, said bars having different lengths.

7. A conduit for sound waves having walls composed of tongues or bars independent of each other in substantially parallel relation, said bars being fixed to the body of said conduit at one end and free at the other.

8. In a conduit for sound waves, a conical portion communicating at its larger end with an enlarged spherical portion, said enlarged spherical portion communicating on the side thereof opposite said conical portion with a second conical portion, and a pyramidal portion with which said last mentioned conical portion communicates.

9. In a conduit for sound waves, a conical portion communicating at its larger end with an enlarged spherical portion, said enlarged spherical portion communicating on the side thereof opposite said conical portion with a second conical portion, said last mentioned conical portion communicating with a pyramidal portion, a cross wall in said first mentioned conical portion adjacent to said enlarged spherical portion, apertures in said cross wall, and means for regulating the extent of opening of said apertures.

In testimony whereof, we have subscribed our names.

ALEXANDER P. McARTHUR.
ELMER FLETCHER.

Witnesses:
CHARLES E. BURNAP,
HENRY A. PARKS.